J. TURNER.
Rendering Apparatus.
No. 33,969.                            Patented Dec. 17, 1861.
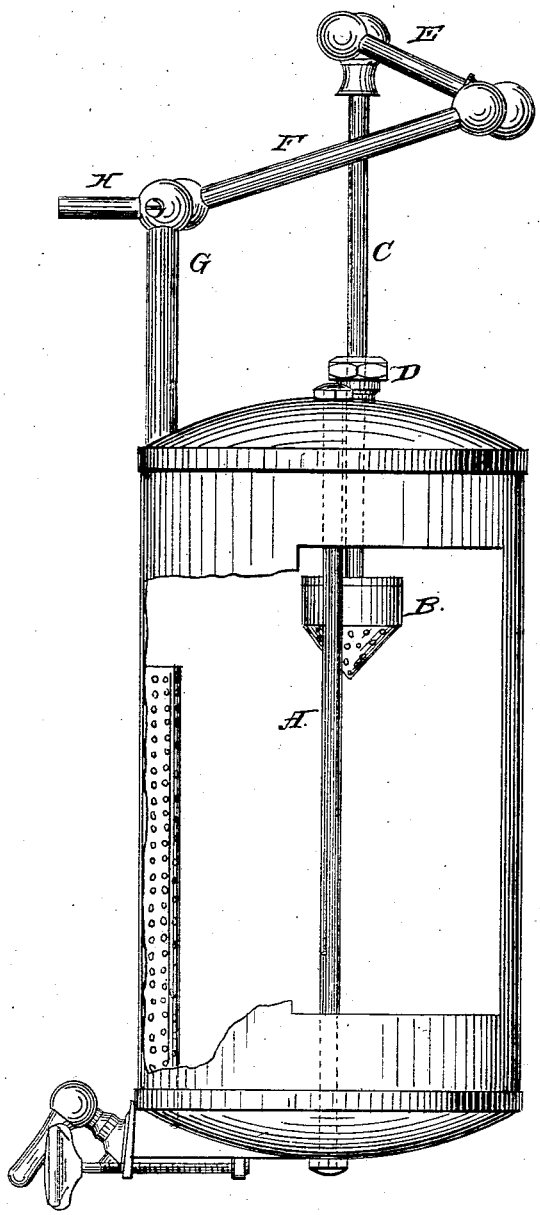

UNITED STATES PATENT OFFICE.

JAMES TURNER, OF CHICAGO, ILLINOIS.

IMPROVED PROCESS OF RENDERING LARD AND TALLOW.

Specification forming part of Letters Patent No. 33,969, dated December 17, 1861.

*To all whom it may concern:*

Be it known that I, JAMES TURNER, of the city of Chicago, county of Cook, and State of Illinois, have invented a new and useful Improvement in Rendering Lard and Tallow; and I do hereby declare that the following is a full, clear, and exact description of the same, reference being had to the annexed drawing, making part of this specification, which illustrates the apparatus for carrying my improvement into practice.

By the process hitherto practiced in rendering lard and tallow in steam-tanks the fat is subjected to the action of steam of a pressure of about fifty pounds per square inch from six to ten hours before it is completely rendered, so that the large proportion of fat that is rendered within the first one or two hours, amounting to three-fourths of the whole, is partially saponified by its continued exposure to the steam while the residue is being rendered. The fat is thereby injured in hardness and color and depreciated in value.

The object of my invention is to save the fat from the injury resulting to it by the action of the steam after it has been rendered, which object I propose to effect by removing the fat from the action of the steam as fast as it is rendered and without interrupting the process of rendering.

The apparatus by which I carry this idea into practice consists of a steam-tight tank A, a float B, and a movable pipe C. The tank is provided with a door in the ordinary manner for admission to the inside thereof. The pipe C passes through a stuffing-box D fixed in the top of the tank. The upper end of this pipe is joined to an elbow-pipe E, which is joined to a vibrating pipe F, the opposite end of which is joined to the standard G, in which is also fixed the stationary pipe H. The joints connecting these pipes are so made as to leave a free communication from one to the other and so that the float can fall as fast as the fat subsides in the tank. The float B is fixed on the lower end of the pipe C. Its lower surface is perforated like a strainer, and it is so proportioned that its weight will overcome the friction of the stuffing-box and joints, and its buoyancy will be sufficient to carry the weight of the pipes and yet float with its lower surface just below the surface of the rendered fat in the tank. By these means the tallow or lard is forced by the pressure of the steam from the tank through the pipes to any desired point as fast as it is rendered and before it is damaged by overheating. It consequently becomes harder on cooling and has a brighter and livelier color. The fat is quickly rendered by this process, for, as there is no longer any danger of overheating it, the pressure of steam may be increased to within the limits of the strength of the tank, The apparatus may thus be made to perform twice the duty it otherwise would, and, moreover, by the semeans the melted fat may be forced by the pressure of the steam in the tank to any desired height, thus enabling the renderer to cleanse it with water as often as he pleases without any handling as it delivers itself from one vessel to another until it finally reaches the package in which it is to be supplied to the market. These are the features which distinguish my invention from the rendering processes already in use and well known.

Now as the object here sought to be and which is hereby accomplished is novel, it matters not in what way it be done, I claim it as my invention, for the object may be accomplished in a variety of ways, and I want it distinctly understood that I do not limit my claim to any particular way; but

What I claim as my invention, and desire to secure by Letters Patent, is—

1. Drawing off the fat as fast as it is rendered by the pressure of the steam in the tank.

2. The process herein described of drawing off the fat as fast as rendered by the use of a steam-tight tank, in combination with a strainer or float and movable or flexible pipe, substantially as set forth.

3. The mode of delivering the melted fat by the pressure of the steam in the tank to any part of the building, substantially as set forth.

JAMES TURNER.

Witnesses:
J. C. MITCHELL,
P. H. WITT.